INVENTOR.
JAMES W. SAUBER,
BY
Charles A. Weigel, Jr

United States Patent Office 3,340,536
Patented Sept. 5, 1967

3,340,536
RECORDER SERVO SYSTEM
James W. Sauber, Winchester, Mass., assignor to Hewlett-Packard Company, a corporation of California
Filed Feb. 4, 1966, Ser. No. 525,211
17 Claims. (Cl. 346—32)

This invention relates to a servo system and, more particularly, to a servo system for accurately positioning an object which system has an improved speed of response and, in one form of the invention, reduced hysteresis.

In the field of automatic control it is often necessary or desirable to control a process such that the process variable maintains a desired performance level. By "process" is meant the collective functions performed in, and by, the equipment in which a variable is to be controlled, i.e., the process variable, which varies as a function of time. The process variable may be the temperature of a furnace, the path of flight of an airplane, the pressure in a tank, or the position of a recorder stylus. To automatically control the process variable, it is necessary to continuously detect the instantaneous deviation or error between the actual and desired values of the process variable. A servo actuator may then act upon this error information to return the process variable to its desired value.

In the case of a conventional recorder, the marker or stylus is positioned relative to a chart paper to produce a visible trace denoting variations of the input signal or signals. The trace may be formed by any one of many known methods including ink, electric marking, pressure modulation of a pressure sensitive paper, or heat fixing of a chemically-treated paper. Many of these recording systems are designed to record relatively high frequency signals and use a galvanometer, usually of D'Arsonval construction, as the servo actuator to convert the electrical input signal to a proportional shaft rotation. Other known systems use a two-phase servomotor. Whatever the application and whatever the system employed there are many sources of errors which prevent the accurate reproduction of the input signal variations. Among these sources of error are nonlinearities existing in the galvanometer itself, or the twisting, bending, or vibrating of the stylus when accelerated rapidly.

Negative position feedback is generally employed to insure the accurate reproduction of the input signal. A transducer, used to sense the actual position of the stylus, generates an electrical output signal linearly related to the stylus' physical displacement. The transducer often is excited by a constant reference voltage and its output signal compared with the electrical input signal. Any difference between the two signals, the error signal, is employed to reposition the stylus. Unfortunately, in sensing the actual position of the stylus, friction is introduced into the drive system and speed of response is sacrificed. Additionally, if a wire wound or slidewire resistance element is employed for the transducer, the sliding contact itself tends to wear out and reduce the operational life of the system. Often when the effects of friction cannot be tolerated the rotary position of the shaft of the galvanometer drive is sensed but this does not permit accurate position control since the lightweight stylus is subject to twisting, bending, etc.

It is, therefore, an object of this invention to obviate many of the disadvantages of the prior art servo position feedback systems.

There is described in U.S. Patent 2,844,776 issued July 22, 1958 to John Dimeff a position transducer in which the position of the movable contactor or pick-off relative to the ends of a resistance element is sensed by electrostatically coupling the pick-off to the resistance element rather than by a wiper in physical contact with the resistance element. This system reduces the friction drag imposed on the stylus but, unfortunately, only a portion of the signal existing on the resistance element is transferred to the pick-off. The particular portion of the signal transferred to the pick-off varies as a function of the size of the pick-off and its distance from the resistive element as well as the electrical loading imposed by the following circuitry. Since the error signal normally employed to reposition the stylus is the difference between the input signal and the position feedback signal, variations in the feedback signal produce inaccuracies. In these prior art systems the signal coupled to the pick-off must be accurately proportioned only to the displacement of the pick-off, i.e., its relative position along the length of the transducer, in order that the stylus displacement shall be invariantly proportional to the incoming electrical signal.

It is, therefore, an object of this invention to accurately position an element in accordance with an input signal.

Another object of this invention is to provide an improved negative position feedback servo system in which the system response is substantially independent of the amount of signal transferred from the position transducer to the feedback system.

An additional object of this invention is to provide an improved position transducer in which the transducer reference voltage varies in accordance with the input signal to be recorded.

In one embodiment of the invention a resistive element is employed for the position transducer in a servo positioning system. A reference voltage signal is established across the resistive element with either end of the element having equal but opposite polarity voltages. These voltages are each varied in the same sense in accordance with the amplitude and polarity of an input signal thereby to provide a null or point of reference potential on the resistive element that varies in position along the length of the resistive element in accordance with the input signal.

A signal pick-off means associated with the resistive element is repositioned by the servo system to seek the null or point of reference potential. When the null point shifts, this produces an error voltage in the servo system which repositions the pick-off until it is again at the null point. This system has the particular advantage that the amount of signal coupled to the pick-off is immaterial and thereby perimts a more accurate positioning to be achieved. In a preferred embodiment of the invention, a capacitively coupled signal pick-off is used. When the capacitive pick-off is used, the frictional drag imposed on the servo system is considerably reduced thereby permitting relatively high speed response to input signal variations.

The novel features that are considered characterisic of this invention are set forth with particularity in the appended claims. The invention itself, however, both as to its organization and method of operation, as well as additional objects and advantages thereof, will best be understood from the following description when read in connection with the accompanying drawings, in which:

Figure 1:
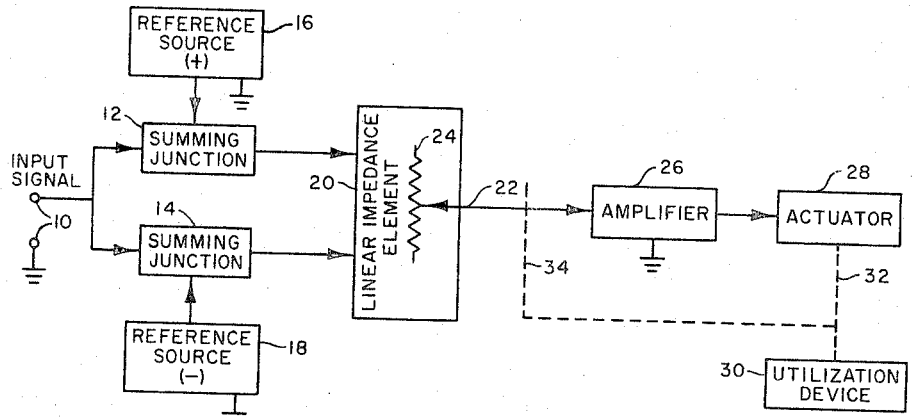
FIGURE 1 is a block diagram of a servo positioning system constructed in accordance with this invention.

In the drawing of FIG. 1 there is shown a generalized servo positioning system constructed in accordance with this invention in which an input signal is applied to a pair of input terminals 10. The input signal may represent the desired path of a guided missile, the desired temperature of a process to be controlled, or any other desired criteria. The input signal is coupled simultaneously to summing junctions 12 and 14, respectively. These summing junctions add the input signal to each of the voltage signals derived from the respective reference sources 16 and 18. The summing junctions may be any suitable circuitry capable of adding together two electrical signals. In its simplest form each of the junctions comprise a pair of resistors connecting the signals to be added to a common point. The reference sources 16 and 18 may be any suitable sources which provide stable controlled voltages. Each of the sources provide voltages of opposite polarity with respect to a point of reference potential such as ground, the positive reference source being designated 16 and the negative source 18. One requirement is that the respective positive and negative voltages equal or exceed the highest DC amplitude of the input signal. The outputs of the respective summing junctions 12 and 14 are coupled to either end of a linear impedance element 20 which has a variable contactor or pick-off designated 22.

The element itself is represented symbolically as a linear resistor 24 having the tap or pick-off 22, but alternatively may be a capacitive element whose capacitance varies as a function of the position of the pick-off 22 relative to either end of the element. The input signal must be alternating current when capacitive elements are used.

In any event the amplitude and polarity of the signal derived by the pick-off 22 with respect to ground is dependent upon the voltages applied to either end of the element 20 and the position of the pick-off 22 relative to either end of the element 20. Since the ends of the element 20 are excited by signals derived by the combination of the input signal with opposite polarity reference voltages, there exists at some point along the length of the element 20 a virtual null or zero voltage with respect to the point of reference potential or system ground. The function of the servo feedback arrangement to be described is to follow or "seek" this virtual null.

To accomplish this, the pick-off 22 is coupled to an amplifier 26 in which the signal on the pick-off 22, which is the error signal, is amplified. The output of the amplifier 26 is coupled to a servo actuator 28 which, responding to the amplified error signal and acting through linkage 32, positions the utilization device. The utilization device may be the fuel valve of a furnace to vary temperature, the guidance system of a missile, or in the case of a recorder, the stylus. A portion of this linkage 32, which is to be described in conjunction with FIG. 3 and which is here designated 34, varies the position of the pick-off 22 relative to either end of the element 20. The sense of the actuator 28 is such that it seeks to reduce the error signal to zero by returning the pick-off 22 to the null point on the impedance element 20.

In the operation of the system illustrated in FIG. 1, an input signal applied to the input terminals 10 is added to the respective positive and negative reference voltages from the sources 16 and 18, respectively, in the respective summing circuits 12 and 14 and applied to either end of the linear impedance element 20. Depending upon the amplitude of the input signal and its polarity relative to system ground, the position of the virtual voltage null existing on the impedance element 20 is shifted. The pick-off 22 immediately senses that it is no longer in the vicinity of the null point and the sensed voltage now existing at its location on the impedance element or any portion of such voltage is transmitted from the pick-off 22 and amplified by the amplifier 26. The amplifier 26 causes the servo actuator 28 to move the utilization device 30 and the pick-off 22 in the direction of the null point.

An important advantage of using a null seeking system of the type described is that all of the error signal need not be transmitted to the amplifier from the pick-off 22 or even picked up by the pick-off 22. Any positional variation of the pick-off 22 from the null point causes the servo system to reposition the pick-off until the null point is again located. This permits capacitive type pick-offs of the type described in the Dimeff patent to be employed with their resultant lower friction and drag and consequent higher response speeds.

Figure 2:
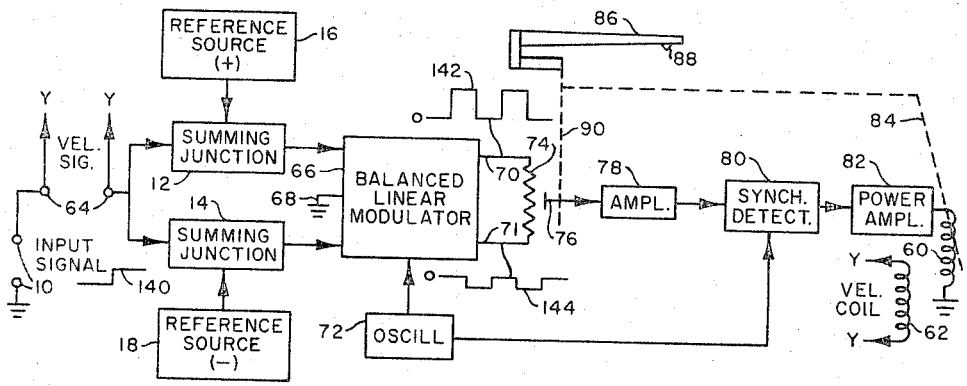
FIGURE 2 is a partial block and partial schematic diagram of another embodiment of the invention in which a position transducer having a capacitive pick-off is employed in the feedback system of a recorder.
Figure 3:
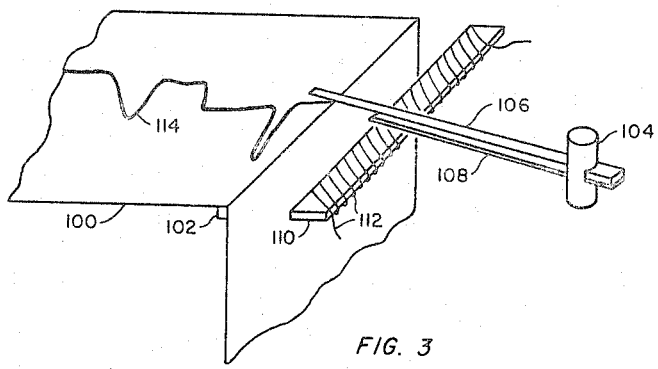
FIGURE 3 is a pictorial view of one form of the capacitive pick-off that may be employed in the recorder illustrated in FIG. 2.

The system shown in FIG. 2 is a modified version of that shown in FIG. 1, but adapted to employ a capacitively coupled sensor of the type described by Dimeff in a galvanometer type recorder. The input signal to be recorded is applied to the input terminals 10. Connected in series with the input terminals 10 is an additional pair of terminals 64 to which a velocity feedback signal is applied from the velocity coil 62 of a conventional D'Arsonval type galvanometer illustrated by the galvanometer coil 60. The connection between the velocity input terminals 64 and the velocity coil 62 is denoted by the lines designated with the small y—y. The function of the velocity coil in a galvanometric recorder system is well known. It provides a feedback signal having an amplitude and polarity that is proportional to the velocity and direction of movement imparted to the galvanometer drive shaft (denoted by the dotted line 84) by the galvanometer drive coil 60. The drive shaft 84 drives a conventional stylus 86 having a nib 88. The nib 88 may be of any well known type such as an ink pen, a heating element, etc., to produce a visible trace 114 (FIG. 3).

Since the stylus 86 has no spring return, the velocity signal in effect performs the function of a spring by feeding back a signal which reduces the amplitude of the input signal in accordance with the stylus velocity. The input signal applied at the terminals 10, as modified by the velocity signal 64, is coupled to the respective summing junctions 12 and 14 and added to the voltage signals furnished by the respective reference sources 16 and 18. Additionally, if desired, the input and velocity signals may be amplified prior to application to the summing junctions. Thus far the systems of FIGS. 1 and 2 are substantially the same.

In accordance with the embodiment of FIG. 2 the outputs of the summing junctions, instead of being connected directly across the transducer element 24, are in this instance connected to a balanced linear modulator 66. Also coupled to the balanced linear modulator is an oscillator 72 which provides a carrier frequency signal that is high relative to the highest frequency input signal that may be applied to the input terminals 10. Any suitable balanced linear modulator such as a transistorized or vibrator reed type chopper modulator may be employed to convert the DC signals derived from the summing circuits 12 and 14 into a synchronous AC voltage for later amplification, etc. The modulator 66 converts each of the input signals from the respective summing junctions into a synchronous AC voltage whose instantaneous magnitude is proportional to that of the summing junction and whose phase relationship to the reference AC carrier frequency voltage is either zero or 180° depending upon the polarity of the voltages at the respective summing junctions. Since the reference sources themselves are of opposite polarity, it is understood that the signals provided in the respective output leads 70 and 71 of the balanced linear modulator 66 are in themselves 180° out of phase one corresponding to each summing junction. The two output leads 70 and 71 from the balanced linear modulator are applied to opposite ends of the transducer element herein illustrated as a linear resistive element 74. They establish a null or point of zero voltage at some point along the element 74. This null or point of zero voltage exists not only within the impedance element itself but in the space around the surface of the element as a zero plane lying perpendicular to the element at this point.

The contactor or pick-off is illustrated as a capacitive pick-off 76 whose position relative to the ends of the element 74 is variable. The particular configuration of the capacitive pick-off 76 may be of any suitable design such as that illustrated in the Dimeff patent or it may take the form illustrated in FIG. 3 as will be described hereinafter. In any event the pick-off 76 is coupled to a high-gain AC amplifier 78 the output of which is coupled to a conventional synchronous detector 80 which receives the reference carrier frequency input from the oscillator 72. The output of the synchronous detector 80 is then coupled to a power amplifier 82 which in turn energizes the galvanometer drive coil 60 to position the stylus 86 and pick-off 76.

In FIG. 3 there is illustrated a strip chart recorder having a recording medium 100. The recording medium may be paper sensitized to heat, light, pressure, or otherwise, which in this case is shown as heat sensitive being drawn by a suitable drive system (not shown) across a heated knife edge element 102. The galvanometer drive shaft 104 is coupled to a stylus boom 106 so as to contact the knife edge element 102 to provide a rectilinear trace 114. In the alternative, of course, curvilinear or XY type plotters may be used as desired. Regardless of what type stylus and what type recording is employed the lower portion of the boom 106 has attached thereto a capacitive pick-off element 108 of the Dimeff type or it may be no more than an electrical plating 109 on the lower portion of an insulator element 108 so as to be in proximity to a wire wound or strip type resistor element 110. In the case of FIG. 3 the resistor element 110 is illustrated as being wire wound at 112.

In operation assume that the input signal, which may be any combination of DC and AC within the band width and amplitude requirements of the system, is applied to the input terminals 10. This input signal and the velocity feedback signal are summed with the opposite polarity reference voltages from the sources 16 and 18 in the summing junctions 12 and 14 and applied to the balanced linear modulator 66 along with a carrier frequency from the oscillator 72. In the modulator 66 the input signal, which may be a step input as illustrated by the waveform 140, is converted to a synchronous AC signal at the carrier frequency and applied to either end of the impedance element 74. With the step input signal 140 the modulated signal appearing at the upper lead 70 from the balanced linear modulator, illustrated by the waveform 142, appears as having a greater amplitude than the negative-going signal appearing at the lower lead 71 and illustrated by the waveform 144. Prior to the introduction of the step input, the two signals 142, 144 had been of approximately equal amplitude but opposite polarity and phase such that a virtual voltage null with respect to system ground existed at the approximate center of the element 74.

In the presence of the input signal 140, and the modulating signals 142, 144, this virtual null is shifted downwardly along the impedance element 74 such that the capacitively coupled pick-off 76 receives an AC signal of such phase as to cause the following servo system to reposition the pick-off 76 to the new location of the virtual null. Assuming that the impedance element 74 has good spatial linearity, that is to say, that from end to end its resistance is a linear function of the length of the element, the shift in the point of virtual null voltage along the impedance element is closely proportional to the input voltage amplitude.

This AC signal is amplified by the AC amplifier 78 and synchronously detected by the detector at 80 so as to provide a DC voltage of such polarity that when amplified by power amplifier 82, the galvanometer drive coil 60, acting through the linkage 84, repositions the pick-off 76 until the new virtual null point on the element 74 is again attained by the pick-off 76.

Among the particular advantages of this invention are that the position of the stylus nib itself is sensed by a sensor that imparts little or no loading or friction to the galvanometer system. Thus the ability of the recorder to follow most variations of the input signal voltage is greatly enhanced. Furthermore the operational life of the transducer element is considerably increased since there is no sliding contact as in usual systems. Linearity is good since a resistive transducer may be used.

It will be obvious that various modifications may be made in the apparatus and in the manner of operating it. It is intended to cover such modifications and changes as would occur to those skilled in the art, as far as the following claims permit and as far as consistent with the state of the prior art.

What is claimed is:

1. A servo system for accurately positioning an object in accordance with the amplitude and polarity, relative to a point of reference potential, of an electrical input signal, comprising:
   a lineal impedance element having an impedance characteristic that varies linearly as a function of the lineal position on said element,
   summing means responsive to said input signal for establishing across said impedance element an electric voltage gradient that encompasses said point of reference potential, thereby to provide a virtual point of reference potential on said element that varies in position on said element in accordance with said input signal,
   a signal pick-off means adapted to be positioned along said element to derive at least a portion of the signal existing on said element, and
   actuator means responsive to the amplitude and polarity of the signal derived by said pick-off means for repositioning said object and said pick-off means lineally of said element to seek said virtual point of reference potential.

2. The servo system set forth in claim 1 in which said impedance element is a resistor.

3. The servo system set forth in claim 2 wherein said signal pick-off means is a movable contactor mounted for movement substantially parallel to and at a substantially predetermined distance from said resistor, thereby to be capacitively coupled to the resistor.

4. The servo system set forth in claim 1 wherein said summing means includes:
   first and second sources of potential each providing an opposite polarity signal relative to said point of reference potential,
   separate means to add said input signal to each of said opposite polarity signals, thereby to provide first and second energizing signals, and
   means to apply said first and second energizing signals across said impedance element thereby to develop a virtual point of reference potential that varies in lineal position on said element in accordance with the amplitude and polarity of said input signal.

5. The servo system set forth in claim 4 wherein said signal pick-off means is a movable contactor mounted for movement substantially parallel to said resistor, thereby to be capacitively coupled to the resistor and wherein
said summing means includes:
   (a) first and second sources of potential each providing an opposite polarity signal relative to said point of reference potential,
   (b) separate means to add said input signal to each of said opposite polarity signals, thereby to provide first and second energizing signals, and
   (c) means to apply said first and second energizing signals across said impedance element thereby to develop a virtual point of reference potential that varies in lineal position on said element in accordance with the amplitude and polarity of said input signal.

6. The servo system set forth in claim 1 wherein said signal pick-off means is a movable contactor mounted for movement substantially parallel to said impedance element, thereby to be capacitively coupled thereto.

7. The servo system set forth in claim 1 wherein said actuator means comprises a galvanometer drive coil and wherein said object is the stylus of a recorder.

8. The servo system set forth in claim 7 wherein said pick-off is positioned on said object thereby to accurately sense its position.

9. The servo system set forth in claim 8 wherein said impedance element is a resistor, said pick-off means is a movable contactor mounted for movement substantially parallel to but removed from said resistor thereby to be capacitively coupled thereto, and wherein said summing means includes:
   (a) first and second sources of potential each providing an opposite polarity signal relative to said point of reference potential,
   (b) separate means to add said input signal to each of said opposite polarity signals, thereby to provide first and second energizing signals, and
   (c) means to apply said first and second energizing signals across said resistor thereby to develop a virtual point of reference potential that varies in lineal position on said resistor in accordance with the amplitude and polarity of said input signal.

10. In a recorder having a stylus adapted to be positioned across a recording medium in accordance with the amplitude and polarity relative to a point of reference potential of an input signal to be recorded, said stylus having a boom, the combination of:
   first and second sources of potential each providing an opposite polarity signal relative to said point of reference potential,
   summing circuit means for combining said input signal with each of said opposite polarity signals, thereby to provide first and second energizing signals,
   an impedance element having an independently variable tap,
   means applying said first and second energizing signals across said impedance element thereby to develop a virtual point of reference potential that varies in lineal position on said element in accordance with the amplitude and polarity of said input signal, and
   servo drive means electrically coupled to said tap for positioning said stylus and said tap along with impedance element to seek said virtual point of reference potential.

11. The recorder set forth in claim 10 which also includes:
   a source of a carrier frequency signal,
   modulating means responsive to each of said energizing signals and to said carrier frequency signal for synchronously modulating said carrier signal with each of said first and second energizing signals, thereby to develop a synchronously modulated voltage gradient along said impedance element,
   said servo drive means being coupled to said modulating means and responsive to the amplitude and phase of said modulated voltage at said tap.

12. The recorder set forth in claim 11 wherein said servo drive means includes a synchronous detector coupled to said source of carrier frequency signals for detecting the modulated voltage signal appearing at said tap.

13. The recorder set forth in claim 11 wherein said tap is positioned on said boom thereby to accurately control the position of said stylus boom in accordance with said input signal.

14. The recorder set forth in claim 12 wherein said tap is positioned on said boom thereby to accurately control the position of said stylus boom in accordance with said input signal.

15. The recorder set forth in claim 11 wherein said impedance element is a resistor.

16. The recorder set forth in claim 15 wherein said tap is a movable contactor mounted for movement substantially parallel to but spaced from said resistor, thereby to be capacitively coupled to the resistor.

17. The recorder set forth in claim 16 wherein said tap is positioned on said boom thereby to accurately control the position of said boom in accordance with said input signal.

References Cited
UNITED STATES PATENTS

| | | | |
|---|---|---|---|
| 2,755,421 | 7/1956 | Roosdorp | 318—29 |
| 2,844,776 | 7/1958 | Dimeff | 318—29 |
| 3,088,788 | 5/1963 | Broun et al. | 346—139 |

RICHARD B. WILKINSON, *Primary Examiner.*

J. W. HARTARY, *Assistant Examiner.*